(12) United States Patent
Ariyur et al.

(10) Patent No.: US 7,580,812 B2
(45) Date of Patent: Aug. 25, 2009

(54) TRENDING SYSTEM AND METHOD USING WINDOW FILTERING

(75) Inventors: Kartik B. Ariyur, Minnetonka, MN (US); Jan Jelinek, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 938 days.

(21) Appl. No.: 10/767,034

(22) Filed: Jan. 28, 2004

(65) Prior Publication Data

US 2005/0165519 A1  Jul. 28, 2005

(51) Int. Cl.
*G06F 15/00* (2006.01)
*H04B 17/00* (2006.01)
(52) U.S. Cl. .................. 702/190; 455/67.11; 702/79
(58) Field of Classification Search .......... 702/34, 702/45, 56, 132, 179, 182, 185, 188, 190, 702/194, 79, 184; 701/29, 99, 100, 110, 701/114; 707/2; 708/203, 303; 700/273; 375/227; 455/67.11
See application file for complete search history.

(56) References Cited

U.S. PATENT DOCUMENTS

| | | | |
|---|---|---|---|
| 3,731,070 A | 5/1973 | Urban | |
| 4,249,238 A | 2/1981 | Spang, III et al. | |
| 4,719,587 A | 1/1988 | Berte | |
| 5,105,372 A | 4/1992 | Provost et al. | |
| 5,210,704 A | 5/1993 | Husseiny | |
| 5,251,151 A | 10/1993 | Demjanenko et al. | |
| 5,257,206 A | 10/1993 | Hanson | |
| 5,319,583 A * | 6/1994 | Wildes ............ | 708/303 |
| 5,406,502 A | 4/1995 | Haramaty et al. | |
| 5,561,610 A | 10/1996 | Schricker et al. | |
| 5,566,091 A | 10/1996 | Schricker et al. | |
| 5,570,300 A | 10/1996 | Henry et al. | |
| 5,629,871 A | 5/1997 | Love et al. | |
| 5,680,310 A | 10/1997 | Morgan et al. | |
| 5,774,385 A | 6/1998 | Bristol | |
| 5,950,147 A | 9/1999 | Sarangapani et al. | |
| 6,119,074 A | 9/2000 | Sarangapani | |
| 6,182,022 B1 | 1/2001 | Mayle et al. | |
| 6,216,066 B1 | 4/2001 | Goebel et al. | |

(Continued)

FOREIGN PATENT DOCUMENTS

EP    0 971 321 A    1/2000

(Continued)

*Primary Examiner*—John H Le
(74) *Attorney, Agent, or Firm*—Ingrassia Fisher & Lorenz, P.C.

(57) ABSTRACT

A trending system and method for trending data in a mechanical system is provided. The trending system includes a sliding window filter. The sliding window filter receives a data set of data points generated by the mechanical system. The sliding window filter partitions the data set into a plurality of data windows, and uses the data windows to calculate upper and lower confidence bounds for the data set. Specifically, the sliding window filter calculates an upper confidence bounds and lower confidence bounds for each data point using each of the multiple data windows that includes the data point. The sliding window filter then selects the upper confidence bounds and the lower confidence bounds that results in the smallest mean prediction confidence interval for that data point. This results in a smoothed estimated trend for the data set that can be used for prognostication and fault detection.

35 Claims, 9 Drawing Sheets

U.S. PATENT DOCUMENTS

| | | |
|---|---|---|
| 6,230,095 B1 | 5/2001 | Wang |
| 6,243,628 B1 | 6/2001 | Bliley et al. |
| 6,363,330 B1 | 3/2002 | Alag et al. |
| 6,430,525 B1 | 8/2002 | Weber et al. |
| 6,466,858 B1 | 10/2002 | Adibhatla et al. |
| 6,480,810 B1 | 11/2002 | Cardella et al. |
| 6,484,132 B1 | 11/2002 | Hively et al. |
| 6,496,817 B1 | 12/2002 | Whang et al. |
| 6,532,412 B2 | 3/2003 | Adibhatla et al. |
| 6,704,353 B1 * | 3/2004 | McCarty et al. ............. 375/227 |
| 6,996,374 B1 * | 2/2006 | Bao et al. ................. 455/67.11 |
| 2002/0087258 A1 | 7/2002 | Johnson |
| 2002/0120416 A1 * | 8/2002 | Liu et al. ..................... 702/79 |
| 2002/0138230 A1 | 9/2002 | Faymon et al. |
| 2005/0165520 A1 * | 7/2005 | Ariyur ........................ 701/29 |

FOREIGN PATENT DOCUMENTS

| | | |
|---|---|---|
| WO | WO 03/025512 A | 3/2003 |
| WO | PCT/US2005/002435 | 7/2005 |

* cited by examiner

TRENDING SYSTEM AND METHOD USING WINDOW FILTERING

FIELD OF THE INVENTION

This invention generally relates to diagnostic systems, and more specifically relates to trending systems for physical systems.

BACKGROUND OF THE INVENTION

Modern physical systems can be exceedingly complex. The complexities of modern systems have led to increasing needs for automated prognosis and fault detection systems. These prognosis and fault detection systems are designed to monitor the system in an effort to predict the future performance of the system and detect potential faults. These systems are designed to detect these potential faults such that the potential faults can be addressed before the potential faults lead to failure in the system.

Physical systems include a variety of mechanical and electrical systems. One type of system where prognosis and fault detection is of particular importance is aircraft systems. In aircraft systems, prognosis and fault detection can detect potential faults such that they can be addressed before they result in serious system failure and possible in-flight shutdowns, take-off aborts, delays or cancellations.

Current prognosis and fault detection systems have relied upon data trending of data from the mechanical system to predict future performance and detect likely faults. In general data trending involves filtering the data to generate a more accurate, filtered estimate of the data. Additionally, data trending can include generating predicted likely future values for the sensor data. Each of these data trending functions facilitates prognosis and fault detection in the mechanical systems.

Current systems have used various statistical techniques for filtering data. As examples, past trending systems have used Kalman filters or exponential filters to filter data. Unfortunately, these current trending systems suffered from many limitations. One particular limitation in Kalman filters is that Kalman filters have typically relied upon certain statistical assumptions. These statistical assumptions may not be valid for some applications. Thus, Kalman filters may not be reasonably applicable to these problems. Another limitation in these current trending systems such as Kalman filters is a lack of accuracy. Thus, these trending systems are unable to accurately determine current sensor values or predict likely future values. This lack of accuracy limits the effectiveness of the prognosis and fault detection system, resulting in potentially unexpected faults and/or false detection of future faults. Other methods such as neural networks and fuzzy logic have also been used for predictions from data. However, these methods generally need careful tuning to the problem at hand. Furthermore, they do not generally provide a quantitative estimate of the reliability of their predictions. Thus, there is a need for improved systems and methods for trending data that offer improved accuracy and reliability.

BRIEF SUMMARY OF THE INVENTION

The present invention provides a trending system and method for trending data in a physical system. The trending system includes a sliding window filter. The sliding window filter receives a data set of data points generated by the mechanical system. The sliding window filter partitions the data set into a plurality of data windows, and uses the data windows to calculate upper and lower confidence bounds for the data set. Specifically, the sliding window filter calculates upper confidence bounds and lower confidence bounds for each data point using each of the multiple data windows that includes the data point. The sliding window filter then selects the upper confidence bound and the lower confidence bound that result in the smallest mean prediction confidence interval for that data point. This results in a smoothed estimated trend for the data set that can be used for prognostication and fault detection.

In some embodiments, the trending system can also include a trend change detection mechanism. The trend change detection mechanism determines a first convex hull for the upper confidence bounds and a second convex hull for the lower confidence bound. The trend change detection mechanism compares the first convex hull and the second convex hull to determine a transition point in the data set. With the transition point determined, the trend change detection mechanism determines a likely future trend for the data set based on the transition point and the points in the data after the transition point.

In some embodiments, the trending system can also include an outlier elimination mechanism. The outlier elimination mechanism uses a left sample window, a right sample window and a test window to determine which, if any data points in the data set are statistical outliers. Specifically, the outlier elimination mechanism generates a first prediction cone from data points in the left sample window, and generates a second prediction cone from data points in the right sample window. The outlier elimination mechanism then determines if data points in the test window reside in the first prediction cone and the second prediction cone. If a data point in the test window does not reside in either the first prediction cone or the second prediction cone, then it can be considered a statistical outlier and removed prior to trending the data set.

BRIEF DESCRIPTION OF DRAWINGS

The preferred exemplary embodiment of the present invention will hereinafter be described in conjunction with the appended drawings, where like designations denote like elements, and.

DETAILED DESCRIPTION OF THE INVENTION

The present invention provides a trending system and method for trending data in a mechanical system. The trending system receives data from the mechanical system and generates a smoothed estimated trend for the data set. This estimated trend can then be used to more accurately determine the performance of the mechanical system and prognosticate future performance.

Figure 1:
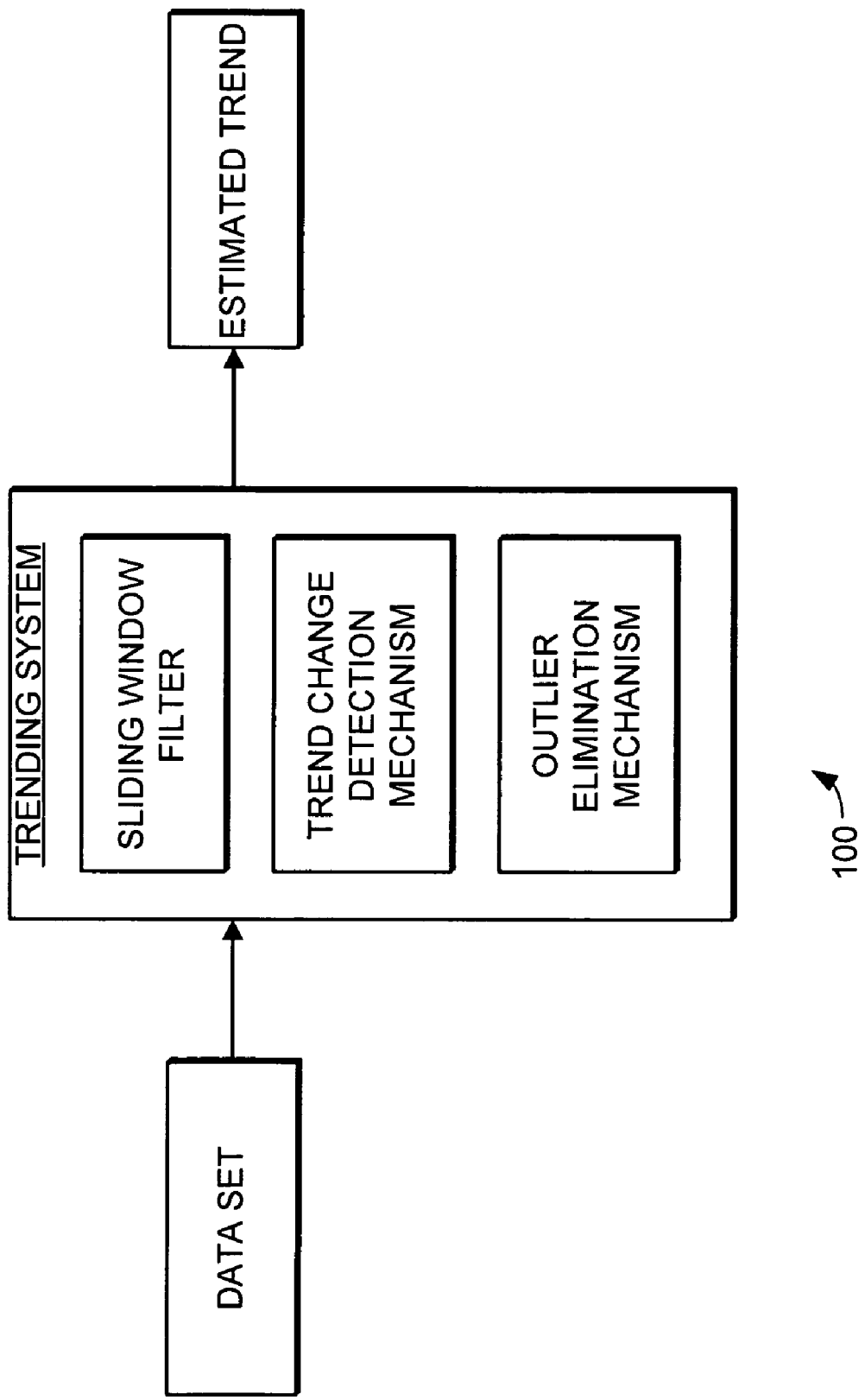
FIG. 1 is a schematic view of a trending system in accordance with an embodiment of the invention.

Turning now to FIG. 1, a trending system 100 is illustrated schematically. The trending system 100 includes a sliding window filter, a trend change detection mechanism, and an outlier elimination mechanism. The sliding window filter receives a data set of data points generated by the mechanical system. The sliding window filter partitions the data set using a plurality of data windows, and uses the data windows to calculate upper and lower confidence bounds for the data set. Specifically, the sliding window filter calculates upper confidence bounds and lower confidence bounds for each data point using each of the multiple data windows that includes the data point. The sliding window filter then selects the upper confidence bounds and the lower confidence bounds that results in the smallest mean prediction confidence interval for that data point. The mid points of the resulting best confidence intervals provide a smoothed estimated trend for the data set that can be used for prognostication and fault detection.

The trending system 100 also includes a trend change detection mechanism. Such a mechanism is desirable in the trending system for determining the last linear trend detectable in a data set. The trend change detection mechanism determines a first convex hull for the upper confidence bounds and a second convex hull for the lower confidence bound. The trend change detection mechanism compares the first convex hull and the second convex hull to determine a transition point in the data set. With the transition point determined, the trend change detection mechanism determines a likely future trend for the data set based on the transition point and the upper confidence bounds and lower confidence bounds.

The trending system 100 also includes an outlier elimination mechanism. The outlier elimination mechanism is desirable for applications where significant portions of the data are subject to noise or other corruption. The outlier elimination mechanism uses a left sample window, a right sample window and a test window to determine which, if any data points in the data set are statistical outliers. Specifically, the outlier elimination mechanism generates a first prediction cone from data points in the left sample window, and generates a second prediction cone from data points in the right sample window. The outlier elimination mechanism then determines if data points in the test window reside in the first prediction cone and the second prediction cone. If a data point in the test window does not reside in either the first prediction cone or the second prediction cone, then it can be considered a statistical outlier and removed prior to filtering and trending the data set.

Figure 2:
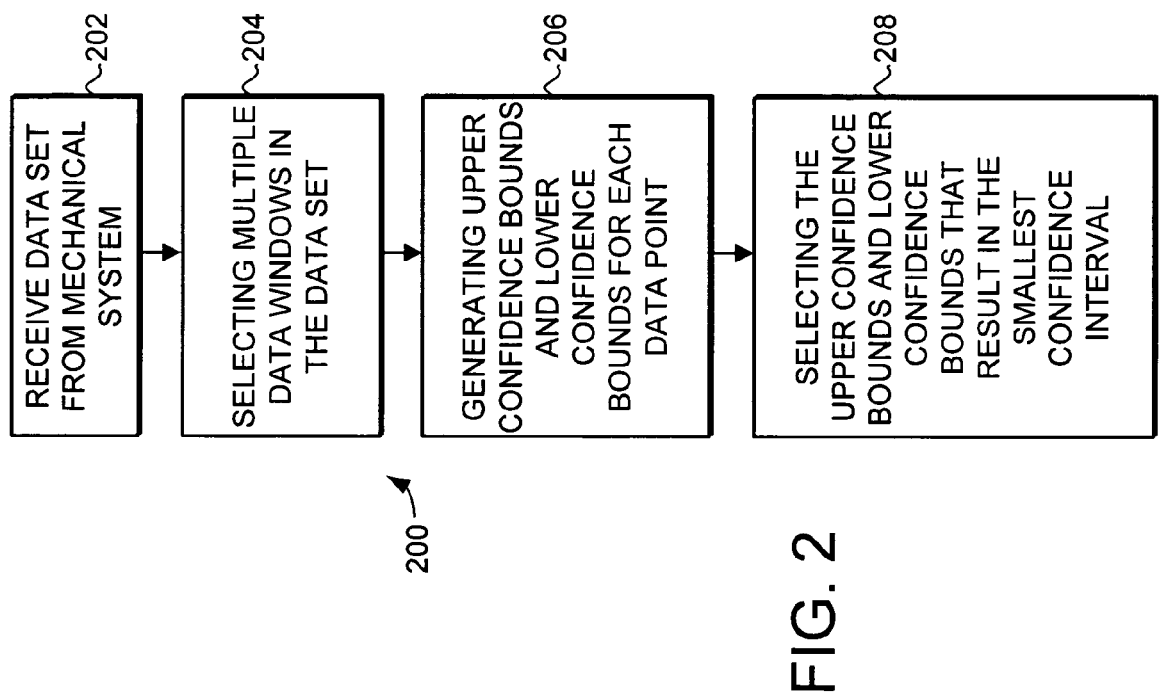
FIG. 2 is a flow diagram illustrating a trending method in accordance with an embodiment of the invention.

Turning now to FIG. 2, a method 200 of generating a smoothed estimated trend is illustrated. The first step 202 of method 200 is to receive a data set from the mechanical system. The data set comprises a plurality of data points generated by the mechanical system from which an estimated trend is to be generated. It should again be noted the method 200 can used for trending performance in a variety of physical systems that produce a series of outputs over time, including electrical and mechanical systems. As one specific example, the system and method can be used for trending performance in turbine machinery such as a turbine engine system used on aircraft. In a turbine engine implementation, the data set can comprise sensor data received from the turbine engine or secondary sources, or data measurements taken by technicians and other maintenance personnel.

The next step 204 is to select multiple data windows in the data set. Each of the data windows includes a subset plurality of data points in the data set, and will be used to generate upper and lower confidence bounds for the data set. The next step 206 is to generate upper and lower confidence bounds for each data point in the data set. Preferably, upper and lower confidence bounds are calculated for each data point using each using each of the multiple data windows that includes the data point. With overlapping data windows this results in multiple confidence bounds for each data point.

The next step 208 is to select the upper and lower confidence bounds for each data point that results in the smallest mean prediction confidence interval for that data point, where the "confidence interval" is the distance between the upper and lower confidence bounds at that point. The mid-points of the resulting "best" confidence bounds provide a smoothed estimated trend for the data set that can be used for prognostication and fault detection.

Figure 3:
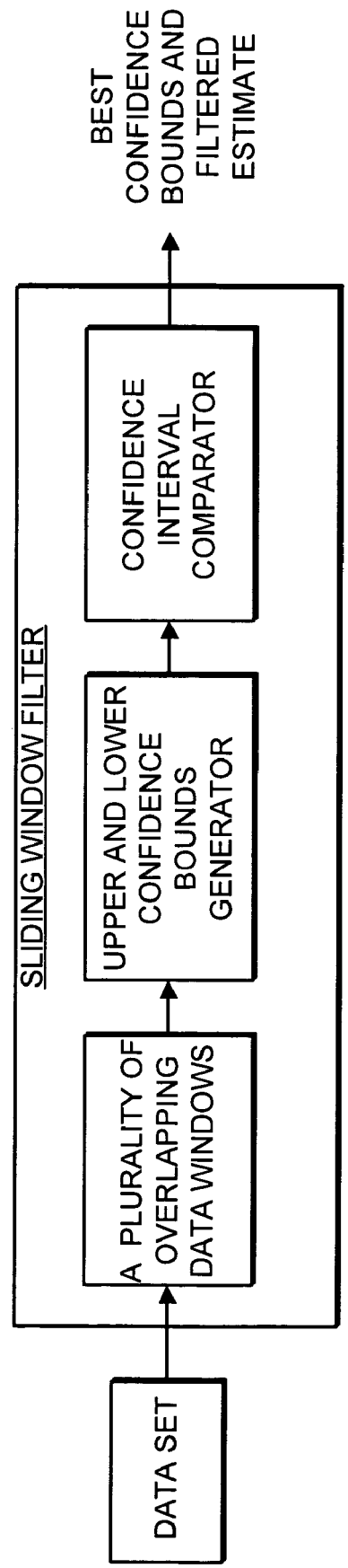
FIG. 3 is a schematic view of an exemplary sliding window filter in accordance with an embodiment of the invention.

Turning now to FIG. 3, an exemplary embodiment sliding window filter 300 is illustrated. The sliding window filter 300 includes a plurality of overlapping data windows, upper and lower confidence bounds generator, and a confidence interval comparator. The sliding window filter 300 receives a data set of data points generated by the physical system. The sliding window filter 300 partitions the data set using a plurality of overlapping data windows. These data windows each define a subset of data points in the data set. Typically, each data window includes a subset of data points that comprises a contiguous sequence of ordered pairs in the data. Each subset of data defined by a window will be used to generate upper and lower confidence bounds for each data point in that window.

The amount of data in each window, or the window "size" would typically be selected based on a variety of factors. For example, it is generally desirable to select the window length such that it is long enough to average out statistical noise and small enough such that the model parameters do not change appreciably within it. For example, the windows could be sized such that each window will include at least three points and perhaps five points to assure a valid statistical sample. In some embodiments, each window would have the same size as the other windows. In other embodiments, the window size could change as it is stepped through the data. For example, the windowing size could be made adaptive, with larger windows in regions of little trend change and smaller windows in regions of greater trend change.

In general, the windows are moved through the data set by stepping the windows through the data set. The size of the window step, the distance in the data set between the beginning of one window and that of the next window, is generally determined by computational constraints such as the required speed of execution. However, in most cases it is desirable to size the step such that adjacent windows overlap. Overlapping the windows allows multiple windows to be used to calculate the upper and lower confidence bounds at each data point, and thus facilitate an improved calculation of the confidence interval.

The upper and lower confidence bounds generator takes the data in each of the plurality of data windows and generates upper and lower confidence bounds for the data in the data window. This can be done using a variety of methods and techniques. One method is to perform a linear regression of the data in the data windows. Specifically, with each window of data, a linear regression is performed to determine the confidence bounds of each data point in the window. In general this is done by fitting lines to the data points within the windows. The slope and intercept of each line is calculated to minimize the mean squared error of the line. The upper and lower confidence bounds are then calculated by using the mean square error of the fit and the probability distribution of the residuals (e.g., the difference between the line and the data).

The upper and lower confidence bounds can be calculated using different confidence levels (generally denoted by a), where the confidence level is the probability that the data will be within the confidence interval. The confidence level used for the confidence interval estimates is preferably chosen to trade off between precision and reliability of the interval estimates. In general, the larger the confidence level required the larger the resulting interval estimates will be.

As stated above, a variety of different linear regression techniques can be used to generate the upper and lower confidence bounds. A general discussion of linear regression will now be given, followed by a discussion of how one exemplary linear regression can be used to generate upper a lower confidence bounds.

Consider a simple linear regression model with a single regressor:

$$y = \beta_0 + \beta_1 x + \epsilon \quad (1.)$$

where the intercept $\beta_0$ and the slope $\beta_1$ are unknown constants, and $\epsilon$ is a random error component, with zero mean and variance $\sigma^2$. Given a data set satisfying:

$$y_i = \beta_0 + \beta_1 x_i + \epsilon_i, \, i=1,2,\ldots,n. \quad (2.)$$

the parameters $\beta_0$ and $\beta_1$ can be estimated through a method of least squares. Such an estimation gives the parameter estimates as:

$$\hat{\beta}_0 = \bar{y} - \hat{\beta}_1 \bar{x} \quad (3.)$$

$$\hat{\beta}_1 = \frac{S_{xy}}{S_{xx}} \quad (4.)$$

where $$\bar{y} = \frac{1}{n}\sum_{i=1}^{n} y_i \text{ and } \bar{x} = \frac{1}{n}\sum_{i=1}^{n} x_i \quad (5.)$$

are the averages of $y_i$ and $x_i$ respectively, and $$S_{xx} = \sum_{i=1}^{n}(x_i - \bar{x})^2 \text{ and } S_{xy} = \sum_{i=1}^{n} y_i(x_i - \bar{x}) \quad (6.)$$

Using the above parameter estimates, the estimate of mean response $E(y|x_0)$ at a point $x_0$ is given by:

$$E(\hat{y}|x_0) = \hat{\mu}_{y|x_0} = \hat{\beta}_0 + \hat{\beta}_1 x_0 \quad (7.)$$

Under the assumption of normal independently distributed error, $\epsilon_i$, the $100(1-\alpha)$ percent confidence interval on the mean response at $x_0$ is:

$$\hat{\mu}_{y|x_0} - t_{\alpha/2,n-2}\sqrt{MSE\left(\frac{1}{2} + \frac{(x_0 - \bar{x})^2}{S_{xx}}\right)} \leq \quad (8.)$$

$$E(\hat{y}|x_0) \leq \hat{\mu}_{y|x_0} + t_{\alpha/2,n-2}\sqrt{MSE\left(\frac{1}{2} + \frac{(x_0 - \bar{x})^2}{S_{xx}}\right)}$$

where $t_{\alpha/2,n-2}$ is the inverse of the cumulative distribution (CDF) of Student's t-distribution with n-2 degrees of freedom at $\alpha/2$ and MSE is an estimate of the noise variance and is equal to the mean square error in the residuals as defined by:

$$MSE = \frac{\sum_{i=1}^{n}(y_i - \hat{y}_i)^2}{n-2} \quad (9.)$$

and where $\hat{y}_i = \hat{\beta}_0 + \hat{\beta}_1 x_i$. The $100(1-\alpha)$ percent confidence interval for a future observation $y_f$ at $X_f$ is given by $$\hat{y}_f - t_{\alpha/2,n-2}\sqrt{MSE\left(1 + \frac{1}{n} + \frac{(x_f - \bar{x})^2}{S_{xx}}\right)} \leq \quad (10.)$$

$$y_f \leq \hat{y}_f + t_{\alpha/2,n-2}\sqrt{MSE\left(1 + \frac{1}{n} + \frac{(x_f - \bar{x})^2}{S_{xx}}\right)}$$

and where $\hat{y}_f = \hat{\beta}_0 + \hat{\beta}_1 x_f$. Equations 8 and 10 define upper and lower confidence bounds for mean prediction and single prediction respectively. The mean prediction defined by equation 8 provides the confidence intervals for the filtered expected values of the data, the estimated values of the actual data with the noise removed. The single prediction defined by equation 8 provides the confidence intervals for the estimated actual expected values, with the noise included. Equations 8 and 10 thus provide two mechanisms for generating confidence intervals from the data set.

Again, the confidence level $\alpha$ defines the probability of confidence that the actual values will lie within the confidence interval defined by the upper and lower confidence bounds. The confidence level a for the interval estimates is thus preferably chosen to trade off between precision and reliability of the interval estimates. Specifically, a small confidence level $\alpha$ will result in a wide interval in equations 8 and 10 with a 1-$\alpha$ probability of the mean or predicted response lying between the limits. Conversely, a larger confidence level $\alpha$ will result in tighter confidence intervals and lower probability of the prediction lying between the bounds.

To describe a specific technique, the upper and lower confidence bounds generator can determine the bounds by fitting lines to the data for each of the overlapping data windows. To do this, the slope $\hat{\beta}_{1,k}$ and intercept $\hat{\beta}_{0,k}$ can be estimated from equations 3 and 4 for each window k. Intervals of mean prediction and single prediction can then be estimated using equations 8 and 10 respectively. Performing this calculation with multiple overlapping data windows results in multiple interval estimates for every point.

As stated above, using multiple overlapping data windows results in multiple upper and lower confidence bounds for every point. These confidence intervals are then passed to the confidence interval comparator to determine the upper and lower confidence bounds for each data point that results in the smallest mean prediction confidence interval for that data point. This results in a smoothed estimated trend for the data set that can be used for prognostication and fault detection.

The minimum confidence interval can be determined by:

$$I^{opt}_{i,k*} = \min_k \left\{ 2t_{\alpha/2, n_k - 2} \sqrt{MSE_k \left( \frac{1}{n_k} + \frac{(x_i - \bar{x}_k)^2}{S_{xx,k}} \right)} \right\} \quad (11.)$$

where $I^{opt}_{i,k*}$ is the minimum width interval corresponding to $k=k*$, $n_k$ is the number of data points inside window k, and the subscript k refers to the calculations made from the linear regression of data in window k. The smoothed estimate of the data set trend can be taken as the estimate of:

$$\hat{y}_{i,k} = \beta_{1,k*} x_i + \beta_{0,k*} \quad (12.)$$

corresponding to $I^{opt}_{i,k*}$, and thus the minimal confidence interval corresponds to the prediction made from window k*. The sliding window filter 300 thus provides a smoothed estimate of a data set 300 by partitioning the data set using a plurality of data windows, calculating the upper confidence bounds and lower confidence bounds for each data point using each of the multiple data windows that includes the data point, and selecting the "best" upper confidence bounds and the lower confidence bounds that results in the smallest mean prediction confidence interval for that data point. The midpoints of the selected bounds provide a smoothed filtered estimate for the data set can then be used for prognostication and fault detection.

It should be noted that the specific method outlined above is suboptimal in the sense that it is not required that the minimum possible confidence interval widths or minimum mean squared error are obtained. This is because it would generally not be desirable to perform the minimization using all possible data windows, but only with a subset of windows determined by computational capacity and time constraints. However, the system and method nevertheless provides the ability to deal with unknown covariances of measurement noise and process noise. Moreover, even in the absence of a model of the underlying physical process, the system and method can still avoid the imposition of an arbitrary model structure upon the data to perform smoothing and prediction. In contrast, a Kalman filter would typically require such a model.

Figure 4:
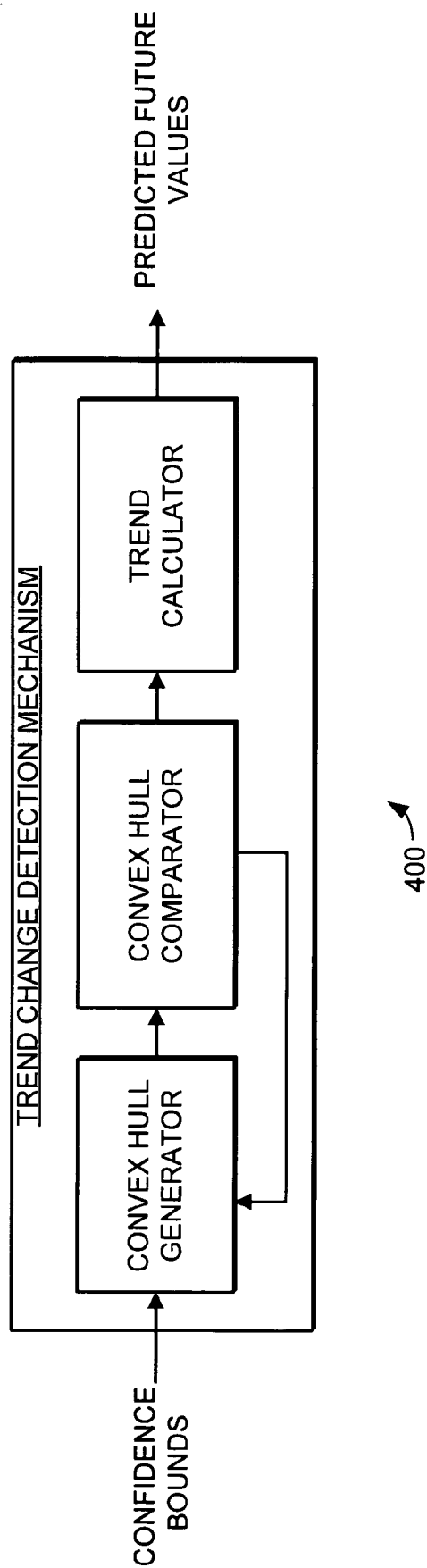
FIG. 4 is a schematic view of an exemplary trend change detection mechanism in accordance with an embodiment of the invention.

Turning now to FIG. 4, an exemplary trend change detection mechanism 400 is illustrated schematically. The trend change detection mechanism 400 is exemplary of the type of mechanism that can be used in the trending system and method. The trend change detection mechanism 400 includes a convex hull generator, a convex hull comparator and a trend calculator. In general, the trend change detection mechanism 400 determines a first convex hull for the upper confidence bounds and a second convex hull for the lower confidence bound using the convex hull generator. The trend change detection mechanism 400 compares the first convex hull and the second the second convex hull to determine a transition point in the data set using the convex hull comparator. With the transition point determined, the trend change detection mechanism 400 determines a likely future trend for the data set based on the transition point and the upper confidence bounds and lower confidence bounds using the trend calculator.

As the term is used in this application, a convex hull of a finite and bounded set of points is defined as the intersection of all of the convex sets containing the set of points. The trend change detection mechanism 400 is based upon the idea that the convex hulls of the upper and lower confidence bounds of mean prediction intersect when the deviation of the trend from linearity is large enough to be perceptible above the noise extant in data. The intersection of the convex hulls of the upper and lower bounds contradicts the assumption of linearity in the trend, and thus can be used to detect deviations from linearity.

The convex hull generator receives the confidence bounds for a data set. The confidence bounds can be calculated using the techniques described above with reference to the sliding window filter or other suitable methods. For example, for many applications it is desirable to use confidence bounds of single prediction such as those described by equation 8 above.

From the confidence bounds, the convex hull generator determines the convex hulls of the upper and lower confidence bounds. This can be done using any suitable technique, such as the variety of standard algorithms that are commercially available. One such technique is a triangulation method that is utilized by the standard MATLAB function convhull.

The convex hull generator passes the computed convex hulls to the convex hull comparator. The convex hull comparator determines if the convex hulls for the upper and lower confidence bounds intersect at any point. This determination can be made using one of several possible methods, such as checking to determine if any point in the convex hull of the lower bounds lies within the convex hull of the upper bounds. An intersection of the convex hulls implies either that a point on the line segment joining two of the upper confidence bounds lies below one of the lower confidence bounds, or that a point on the line segment joining two of the lower confidence bounds lies above one of the upper confidence bounds. Thus, an intersection in the convex hulls implies that a trend change exists in the portion of the data set that was the source data for the upper and lower confidence bounds.

Thus, if the convex hulls for the upper and lower confidence bounds intersect, the points in the data set and corresponding confidence bounds prior to the intersection are removed, and the convex hull generator again calculates the convex hulls for the remaining upper and lower confidence bounds. The convex hull comparator then compares the newly calculated convex hulls to determine if an intersection still exists. This iterative process is continued until a modified data set is found that results in non-intersecting convex hulls.

When a data set is found that results in non-intersecting convex hulls, the trend calculator can determine predicted future values of the data set using the last trend in the data. As one example, a least squares fit line can be drawn through all the remaining data points to determine the trend of predicted future values. This can also be used to calculate future confidence interval estimates, such as interval estimates of mean prediction and/or future single prediction as may be needed.

The trend change detection mechanism thus applies linear statistical inference to batch data. It increases the precision in identifying trend changes in data by using the convex hulls of the confidence bounds to identify changes in the trend.

This method has several important resulting properties, including those that arise as a result of the statistical nature of data, and those that arise from assuming linear underlying trends. Under the first category, there is an issue in detecting trend changes smaller than the variance when our sample sizes in the sample windows are small. Specifically, the method generally does not precisely distinguish the points where trends change, but only in some region around them. Under the second category, slow continuous trend changes that appear may not be distinguished as they are locally linear and change cumulatively. Thus, a continuous trend change may be broken into several linear pieces and possibly reduce the extent to which the data can be extrapolated.

The method further can supply clear information as to when greater frequency of data collection is needed, as infrequent collection of data leads to wide interval estimates for future prediction. The method can also be used to determine when there is insufficient data to reasonably extrapolate from data available up to the current time. This typically occurs when a trend change is detected very near the end of the available data, and there are few points from which to extrapolate into the future. If the confidence intervals of future prediction from the last detected trend are extremely wide, then the probability of the data ordinate reaching a certain value between certain future times will be very small, and it is desirable to wait for more data to establish a trend.

Figure 5:
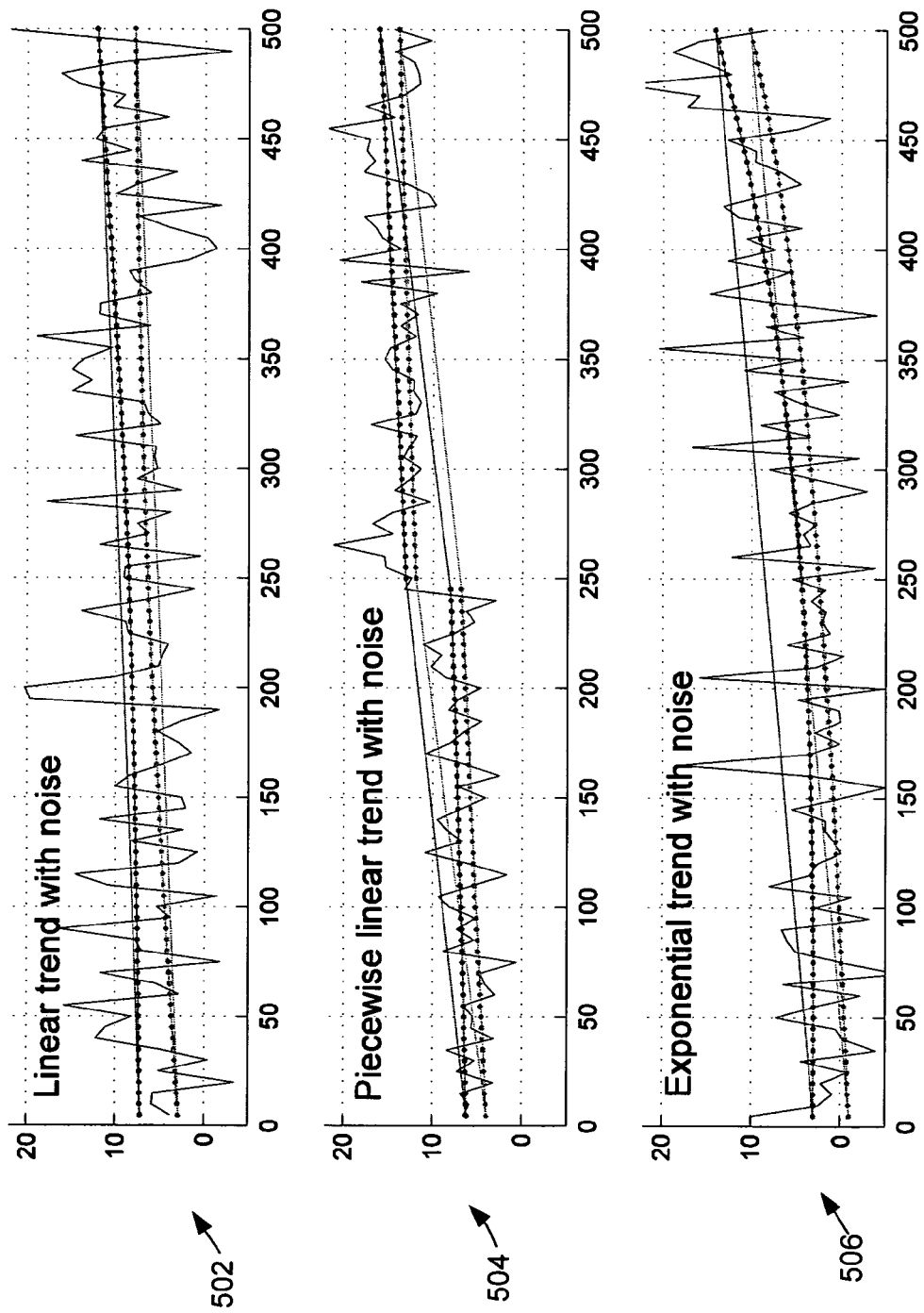
FIG. 5 is three graphical examples of convex hulls of mean prediction in accordance with an embodiment of the invention.

Turning now to FIG. 5, three graphical examples of convex hulls of mean prediction bounds (as calculated using equation 8) for data with additive noise are illustrated. Specifically, FIG. 5 includes a top plot 502, a middle plot 504 and a bottom plot 506. Each plot shows a set of noisy data with a different underlying trend. Each plot also illustrates the convex hulls that are generated after filtering using a sliding window filter to remove the effects of the noise as was described above. The top plot 502 illustrates upper and lower convex hulls where the underlying trend of the data (with the noise removed) is a continuous straight line. Likewise, the middle plot 504 illustrates upper and lower convex hulls where the underlying trend of the data (with the noise removed) is a piecewise continuous line with a jump at x=250. Finally, the bottom plot 506 illustrates upper and lower convex hulls where the underlying trend of the data (with the noise removed) is an exponential curve. In the top plot 502, the upper and lower convex hulls do no intersect because for a line, the upper confidence limits are above the line and the lower confidence limits are below it. However, in the middle plot 504 the convex hulls intersect since there are two lines, the second above the other. Similarly, in the bottom plot 506, the convex hulls of the confidence bounds of the exponential intersect as the slope of the curve changes significantly within the sample considered. It should be noted that if the noise was higher, or if the confidence levels were set higher, the convex hulls may not intersect. In all three cases, the intersection points of the convex hulls can be used to determine a transition point in the data set as described above. With any transition point determined, the trend change detection mechanism determines a likely future trend for the data set based on the transition point and the points in the data after the transition point.

Figure 6:
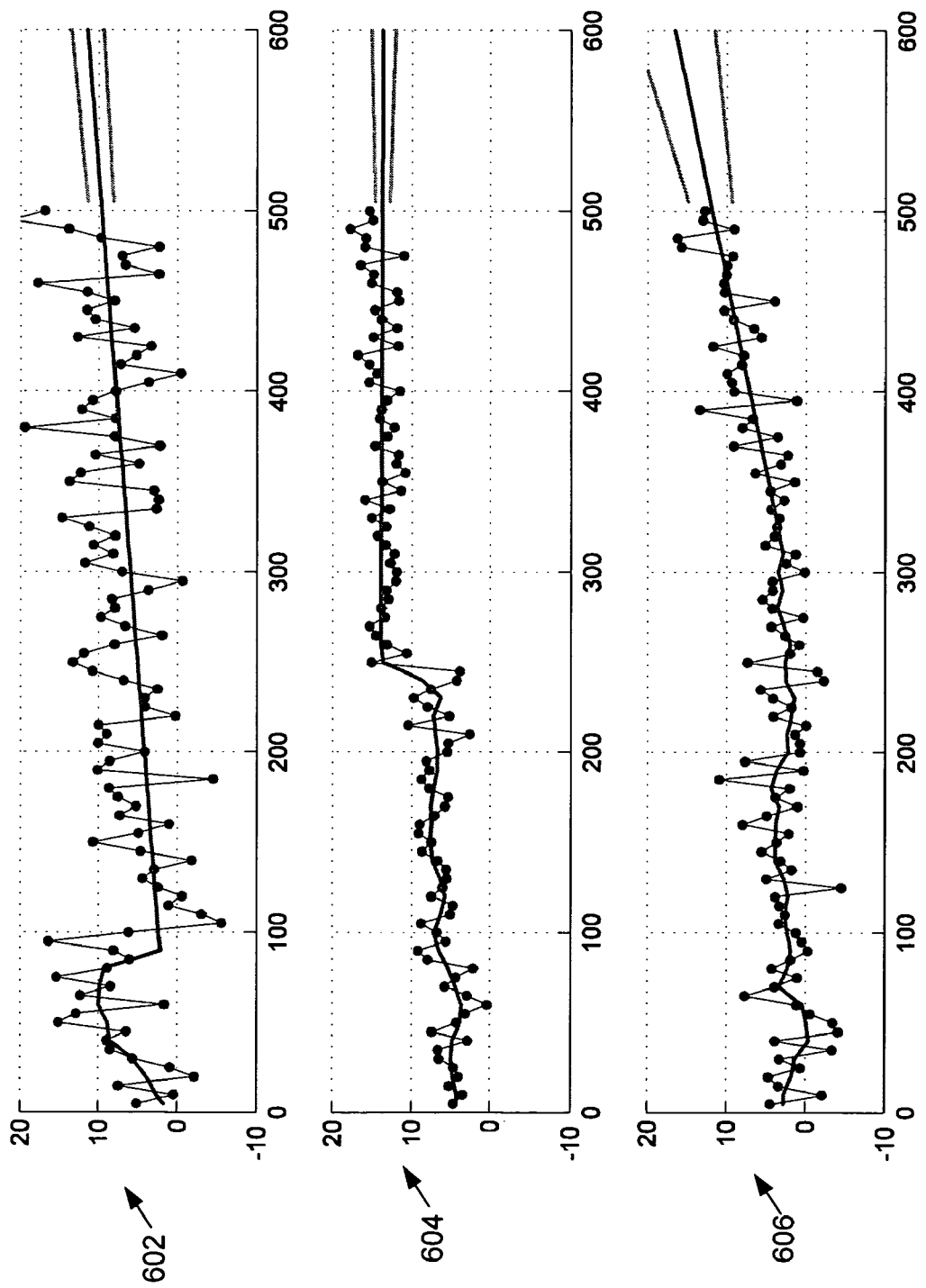
FIG. 6 is three graphical examples of smoothing and trend prediction in accordance with an embodiment of the invention.

Turning now to FIG. 6, three graphical examples of smoothing and trend prediction are shown. Specifically, FIG. 6 includes a top plot 602, a middle plot 604 and a bottom plot 606. Again, each plot shows a set of noisy data with a different underlying trend, illustrated as a set of points connected by lines. Each plot also illustrates a smoothed estimated trend that can be generated from noisy data using a sliding window filter as described above. Finally each plot shows upper and lower confidence bounds used to predict future values of the data set. The top plot 602 illustrates smoothed filtered estimate and confidence bounds for future prediction where the underlying trend of the data (with the noise removed) is a continuous straight line. Likewise, the middle plot 604 illustrates the smoothed filtered estimate and confidence bounds for future prediction where the underlying trend of the data (with the noise removed) is a piecewise continuous line with a jump at x=250. Finally, the bottom plot 606 illustrates the smoothed filtered estimate and confidence bounds for future prediction where the underlying trend of the data (with the noise removed) is an exponential curve.

The plots show how the sliding window filter algorithm can identify different smoothed trends within the data depending upon the parameters used, the variance in the data and the size of the sample. Again, it should be noted that these trends can be distorted by the presence of statistical outliers, which can be removed as will be discussed in greater detail below. It should also be noted that the trend change in the middle plot is only approximately detected. Finally, the prediction for nonlinear curves usually results in wider confidence bounds. This is seen in the prognostic from the exponential curve in the bottom plot. This is because the change in trend necessitates the use of only a relatively small part of the data for prediction, the part after which the convex hulls of upper and lower confidence bounds do not intersect.

Figure 7:
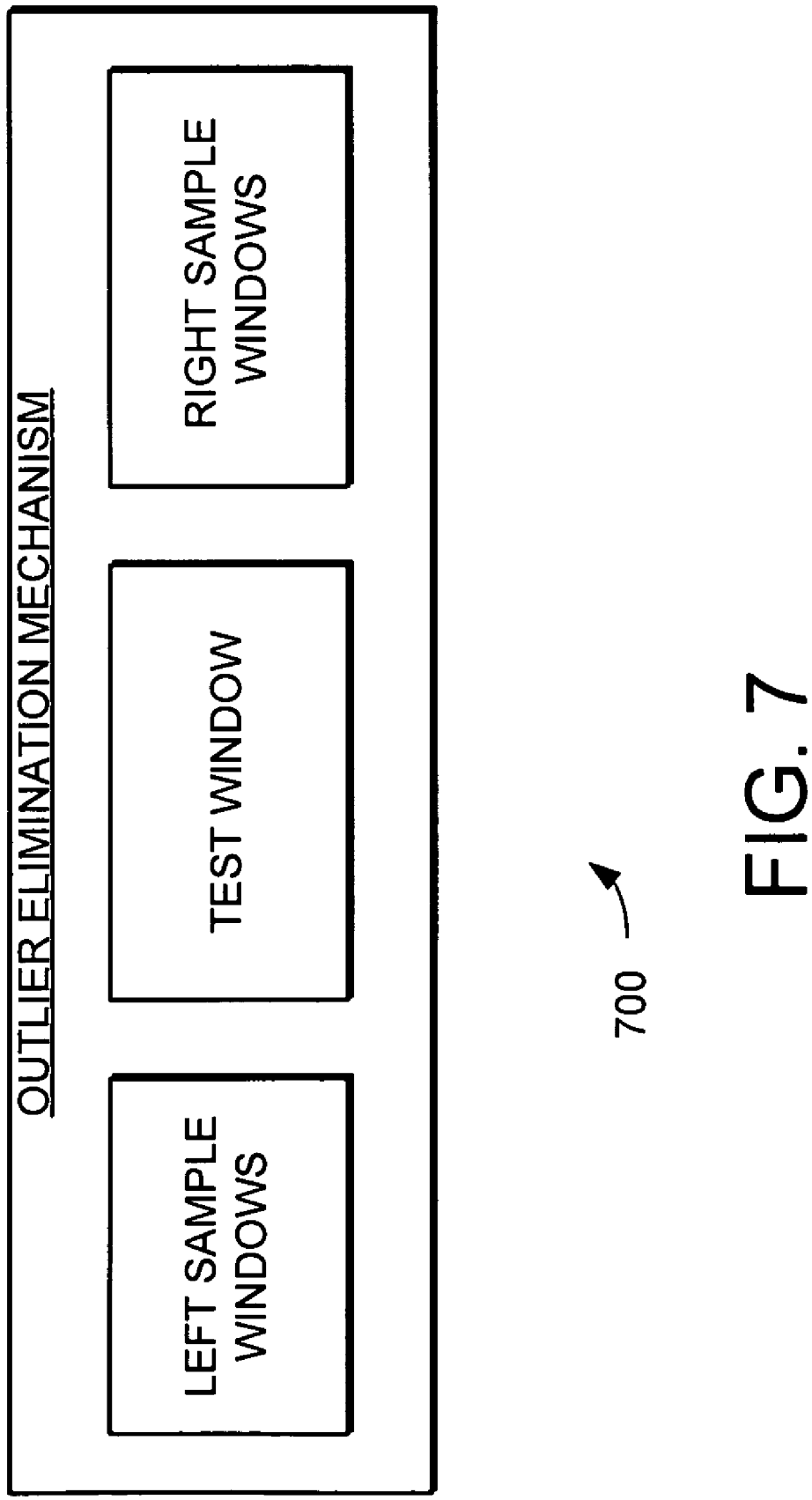
FIG. 7 is a schematic view of an exemplary outlier elimination mechanism in accordance with an embodiment of the invention.

Turning now to FIG. 7, an outlier elimination mechanism 700 is illustrated schematically. The outlier elimination mechanism 700 is an example of the type of mechanism that can be used in the trending system and method. The outlier elimination mechanism 700 includes left and right sample windows and a test window to determine which, if any data points in the data set are statistical outliers. Statistical outliers are those points which can be assumed to be corrupted because they are outside the appropriate confidence intervals at that point. Specifically, the outlier elimination mechanism 700 generates a first prediction cone from data points in the left sample window, and generates a second prediction cone from data points in the right sample window. The outlier elimination mechanism 700 then determines if data points in the test window reside in the first prediction cone and the second prediction cone. If a data point in the test window does not reside in either the first prediction cone or the second prediction cone, then it can be considered a statistical outlier and removed prior to trending the data set.

Typically, the outlier elimination mechanism 700 would be applied to data before it is trended using the sliding window filter and/or trend change mechanism. Removing statistical outliers by using the mechanism prior to trending can result in improved accuracy for the final estimated trend output.

As stated above, the outlier elimination mechanism 700 includes a left sample window, a right sample window, and a test window. These data windows are "stepped" together through the data in the set, and an outlier elimination calculation is performed at each step. Stepping the data windows through the data set facilitates the location of statistical outliers throughout the complete data set. Furthermore, selecting a step size that results in overlapping the data windows facilitates multiple calculations for each data point and thus can be used to improve the accuracy of the system. The size of the test window is preferably selected to ensure that at least one data point exists in the test window at each window location. Generally, a larger window results in faster execution.

As stated above, the outlier elimination mechanism 700 generates a first prediction cone from data points in the left sample window, and generates a second prediction cone from data points in the right sample window. This can be done by fitting a linear regression line to the data in the left sample window and fitting another linear regression line to the data in the right sample window at every window step. The resulting linear regression lines are used to make prediction cones at a specified level of confidence. Specifically, the prediction cone is a set of single prediction confidence intervals for the data points in the test window as generated by the data in the left and right sampling windows. The prediction cones are then compared with the data points in the test window. If a data point does not fall within the prediction cone for either the left or right sample windows, the data point can be assumed to be a statistical outlier. If the data point is within either prediction cone, then it can be assumed to not be a statistical outlier.

To improve the accuracy of the method, the outlier elimination calculation can be calculated using several overlapping left and right sample windows, and the outlier determination done by combining the results of the overlapping windows. The outlier calculations can be combined by voting using a variety of different weighting techniques. As two specific examples, the results can be combined by using the reciprocal of the interval estimates produced by the window, or they can be combined unweighted using a simple majority.

Figure 8:
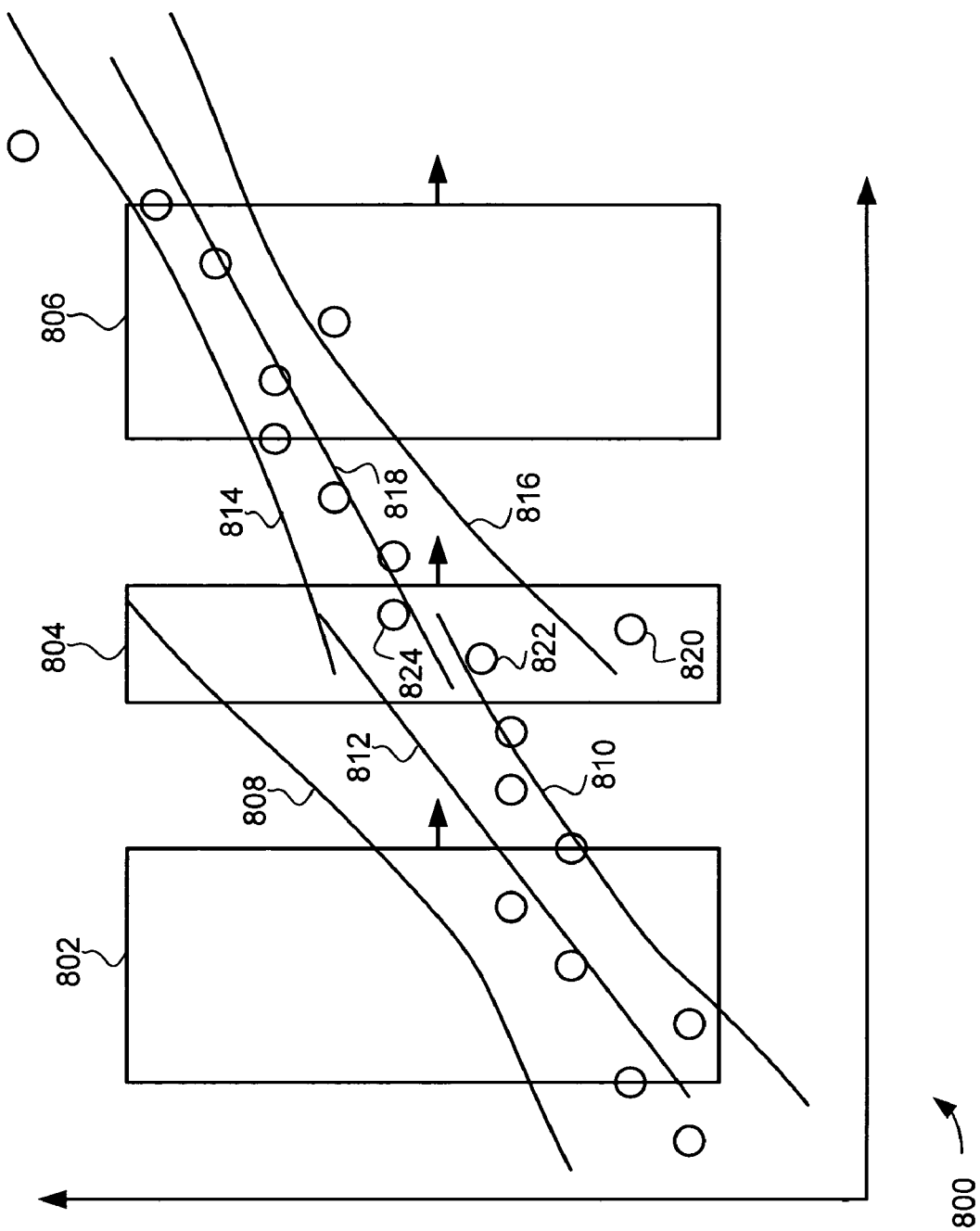
FIG. 8 is a graphical example of left sample window, right sample window and test window with sample data in accordance with an embodiment of the invention.

Turning now to FIG. 8, a graphical example 800 of a left sample window 802, a test window 804 and a right sample window 806 are illustrated. The windows 802, 804 and 806 are "stepped" together through the data in the set, and an outlier elimination calculation is performed at each step. Specifically, at each step a first prediction cone is generated from data points in the left sample window 802 and a second prediction cone is generated from data points in the right sample window 806. In FIG. 8, a linear regression line 812 of the data in the left sample window 802 is used to generate a first prediction cone comprising upper confidence bounds 808 and lower confidence bounds 810. Likewise, a linear regression line 818 of the data in the right sample window 806 is used to generate a second prediction cone comprising upper confidence bounds 814 and lower confidence bounds 816. The resulting prediction cones are used to determine if data in the test window 804 include any statistical outliers. In the example 800, the data point 820 is outside the prediction cone for both the left and right sample windows, and thus can be can be assumed to be a statistical outlier. Conversely, data points 822 and 824 in the test window are both inside at least one prediction cone, and thus can be assumed to not be statistical outliers.

A specific example of an outlier elimination method will now be given. In this method, the confidence intervals of single prediction of the left and right sample windows for data points in the test window are calculated as follows:

$$I_i = [\hat{y}_i - t_{\alpha/2, n-2} s_{\hat{y}_i}, \hat{y}_i + t_{\alpha/2, n-2} s_{\hat{y}_i}] \quad (13.)$$

where $$\hat{y}_i = \hat{m} t_i + \hat{\mu} \quad (14.)$$

and $t_i$ denotes the time of collection of data ordinate $y_i$. And where $$s_{\hat{y}_i}^2 = MSE \left[ 1 + \frac{1}{n} + \frac{(t_i - \bar{t})^2}{\sum_{j=1}^{n}(t_j - \bar{t})^2} \right] \quad (15.)$$

$$MSE = \frac{\sum_{j=1}^{n}(y_j - \bar{y})^2}{n-2} \quad (16.)$$

$$\bar{t} = \frac{1}{n}\sum_{j=1}^{n} t_j; \quad \bar{y} = \frac{1}{n}\sum_{j=1}^{n} y_j; \quad (17.)$$

and where $\hat{m}$ and $\hat{\mu}$ are obtained through the list squares fit to data points in the sample window, $t_{\alpha/2, n-2}$ is the inverse function of the cumulative distribution function of Student's t-distribution with n-2 degrees of freedom evaluated at $\alpha/2$ and n is the number of data points in the sample window.

The votes $V_{ik, L/R}$ of the left/right windows can be summed in the following manner:

$$V_{i,L} = \sum_{k=1}^{N_{win}} V_{ik,L}; \quad V_{i,R} = \sum_{k=1}^{N_{win}} V_{ik,R} \quad (18.)$$

where, the votes are calculated according to:

$$V_{i,L/R} = \begin{cases} \frac{1}{2 t_{\alpha/2, n-2} s_{\hat{y}_i}} & \text{if } y_i \in [\hat{y}_i - t_{\alpha/2, n-2} s_{y_i}, \hat{y}_i + t_{\alpha/2, n-2} s_{y_i}] \\ \frac{-1}{2 t_{\alpha/2, n-2} s_{\hat{y}_i}} & \text{if } y_i \notin [\hat{y}_i - t_{\alpha/2, n-2} s_{y_i}, \hat{y}_i + t_{\alpha/2, n-2} s_{y_i}] \end{cases} \quad (19.)$$

If after calculating the votes, the voting sums $V_{i,L}<0$ and $V_{i,R}<0$, the data point can be marked as an outlier. If $V_{i,L}<0$ and $V_{i,R}>0$, then this data point marks the beginning of a new trend. If $V_{i,L}>0$ and $V_{i,R}<0$, the next point can be marked as the beginning of a new trend. If $t_i - t_{i-1} > L_w$, the point can be marked with a new trend number. Finally, if there are too few points in the sample window, then the data point should be marked as indeterminate.

The outlier elimination mechanism 700 thus uses the left sample, right sample and test window to determine which, if any data points in the data set are statistical outliers. The outlier elimination mechanism 700 then determines if data points in the test window reside in the first prediction cone generated by the left sample window and the second prediction cone generated by the right sample window. If a data point in the test window does not reside in either the first prediction cone or the second prediction cone, then it can be considered a statistical outlier and removed prior to trending the data set.

Figure 9:
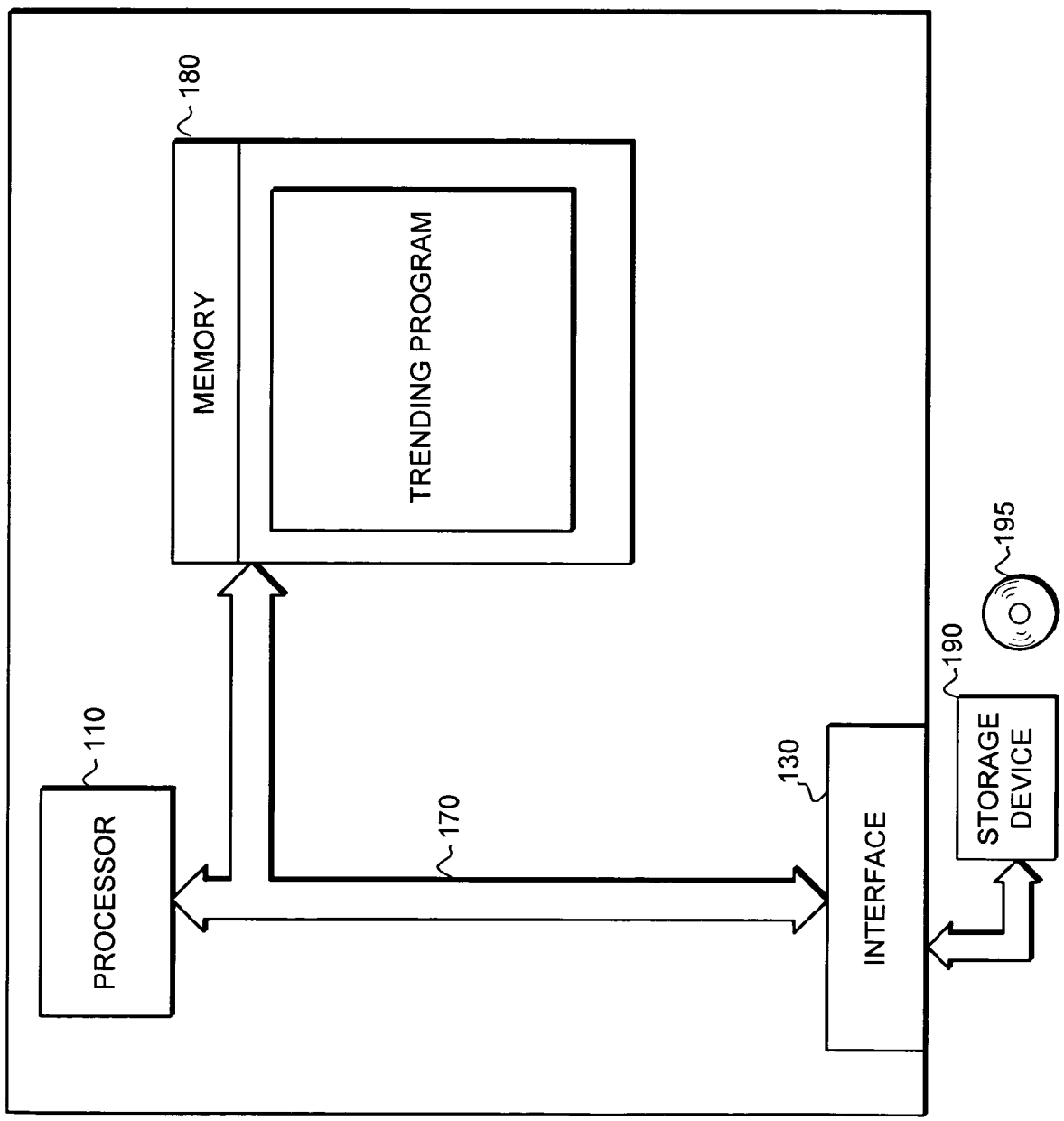
FIG. 9 is a schematic view of an exemplary computer system in accordance with an embodiment of the invention.

The trending system and method can be implemented in a wide variety of platforms. Turning now to FIG. 9, an exemplary computer system 50 is illustrated. Computer system 50 illustrates the general features of a computer system that can be used to implement the invention. Of course, these features are merely exemplary, and it should be understood that the invention can be implemented using different types of hardware that can include more or different features. It should be noted that the computer system can be implemented in many different environments, such as onboard an aircraft to provide onboard diagnostics, or on the ground to provide remote diagnostics. The exemplary computer system 50 includes a processor 110, an interface 130, a storage device 190, a bus 170 and a memory 180. In accordance with the preferred embodiments of the invention, the memory system 50 includes a trending program. As discussed above, the trending program can include a sliding window filter, a trend change detection mechanism, and an outlier elimination mechanism.

The processor 110 performs the computation and control functions of the system 50. The processor 110 may comprise any type of processor, include single integrated circuits such as a microprocessor, or may comprise any suitable number of integrated circuit devices and/or circuit boards working in cooperation to accomplish the functions of a processing unit. In addition, processor 110 may comprise multiple processors implemented on separate systems. In addition, the processor 110 may be part of an overall vehicle control, navigation, avionics, communication or diagnostic system. During operation, the processor 110 executes the programs contained within memory 180 and as such, controls the general operation of the computer system 50.

Memory 180 can be any type of suitable memory. This would include the various types of dynamic random access memory (DRAM) such as SDRAM, the various types of static RAM (SRAM), and the various types of non-volatile memory (PROM, EPROM, and flash). It should be understood that memory 180 may be a single type of memory component, or it may be composed of many different types of memory components. In addition, the memory 180 and the processor 110 may be distributed across several different computers that collectively comprise system 50. For example, a portion of memory 180 may reside on the vehicle system computer, and another portion may reside on a ground based diagnostic computer.

The bus 170 serves to transmit programs, data, status and other information or signals between the various components of system 100. The bus 170 can be any suitable physical or logical means of connecting computer systems and components. This includes, but is not limited to, direct hard-wired connections, fiber optics, infrared and wireless bus technologies.

The interface 130 allows communication to the system 50, and can be implemented using any suitable method and apparatus. It can include a network interfaces to communicate to other systems, terminal interfaces to communicate with technicians, and storage interfaces to connect to storage apparatuses such as storage device 190. Storage device 190 can be any suitable type of storage apparatus, including direct access storage devices such as memory cards, hard disk drives, flash systems, floppy disk drives and optical disk drives. As shown in FIG. 9, storage device 190 can comprise a disc drive device that uses discs 195 to store data.

In accordance with the preferred embodiments of the invention, the computer system 50 includes a trending program. Specifically during operation, the trending program is stored in memory 180 and executed by processor 110. When being executed by the processor 110, trending program receives data sets and filters and determines estimated trends of data sets. These estimated trends can be then used by a technician or other user to interact with the system in order to arrive at proper diagnostic and prognostics.

As one example implementation, the trending system can operate on data that is acquired from the physical system (e.g., aircraft) and periodically uploaded to an internet website. The trending analysis is performed by the web site and the results are returned back to the technician or other user. Thus, the system can be implemented as part of a web-based diagnostic and prognostic system.

It should be understood that while the present invention is described here in the context of a fully functioning computer system, those skilled in the art will recognize that the mechanisms of the present invention are capable of being distributed as a program product in a variety of forms, and that the present invention applies equally regardless of the particular type of signal bearing media used to carry out the distribution. Examples of signal bearing media include: recordable media such as floppy disks, hard drives, memory cards and optical disks (e.g., disk 195), and transmission media such as digital and analog communication links, including wireless communication links.

It should also be understood that while the present invention has been described in one example as a trending system for trending turbine machinery performance, that the present invention can also be applied to other physical systems in general and other aircraft systems in particular. Examples of the types of aircraft systems that the present invention can be applied to include environmental control systems, aircraft hydraulic systems, aircraft fuel delivery systems, lubrication systems, engine starter systems, aircraft landing systems, flight control systems and nuclear, biological, chemical (NBC) detection systems.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

The invention claimed is:

1. A trending system for trending data from a physical system, the trending system comprising:
a sliding window filter, the sliding window filter adapted to receive a data set from the physical system, the data set comprising a plurality of data points, the sliding window filter selecting multiple data windows in the data set, with each of the data windows including a subset plurality of the data points in the data set, and with adjacent windows in the multiple data windows overlapping in the data set, the sliding window filter adapted to generate upper confidence bounds and lower confidence bounds for each data point using each of the multiple data windows that includes the data point, the sliding window filter adapted to select an upper confidence bounds and a lower confidence bounds for each data point that results in the smallest confidence interval between the upper confidence bounds and lower confidence bounds for that data point, and wherein the sliding window filter is adapted to generate a filtered estimate of the data set from the selected upper confidence bounds and lower confidence bounds for each data point; and
a trend change detection mechanism, the trend change detection mechanism adapted to determine a first convex hull for a set of upper confidence bounds and a second convex hull for a set of lower confidence bounds, the trend change detection mechanism adapted to compare the first convex hull and the second convex hull to determine a transition point in the data set, the trend change detection mechanism adapted to determine an estimated trend of the data set based on the transition point and the set of upper confidence bounds and the set of lower confidence bounds.

2. The system of claim 1 wherein the trend change detection mechanism is adapted to compare the first convex hull to the second convex hull by determining if the first convex hull and the second convex hull intersect.

3. The system of claim 1 wherein the trend change detection mechanism is adapted to compare the first convex hull and the second convex hull to determine a transition point in the data stream by determining if the first convex hull and the second convex hull intersect, and by iteratively discarding points in the data set and generating a new first convex hull and a new second convex hull until there is no intersection between the new first convex hull and the new second convex hull.

4. The system of claim 1 wherein the physical system comprises an aircraft system.

5. The system of claim 1 wherein the sliding window filter is adapted to generate the upper confidence bounds and lower confidence bounds through linear regression and statistical inference of the data set.

6. A trending system for trending data from a physical system, the trending system comprising:
   a sliding window filter, the sliding window filter adapted to receive a data set from the physical system, the data set comprising a plurality of data points, the sliding window filter selecting multiple data windows in the data set, with each of the data windows including a subset plurality of the data points in the data set, and with adjacent windows in the multiple data windows overlapping in the data set, the sliding window filter adapted to generate upper confidence bounds and lower confidence bounds for each data point using each of the multiple data windows that includes the data point, the sliding window filter adapted to select an upper confidence bounds and a lower confidence bounds for each data point that results in the smallest confidence interval between the upper confidence bounds and lower confidence bounds for that data point, and wherein the sliding window filter is adapted to generate a filtered estimate of the data set from the selected upper confidence bounds and lower confidence bounds for each data point; and
   an outlier elimination mechanism, the outlier elimination mechanism adapted to remove statistical outliers in the data set by generating a first prediction cone for data points in a left sample window, generating a second prediction cone for data points in a right sample window, and determining if data points in a test window reside in the first prediction cone and the second prediction cone.

7. The system of claim 6 wherein the sliding window filter is adapted to generate the upper confidence bounds and lower confidence bounds through linear regression and statistical inference of the data set.

8. The system of claim 7 wherein the sliding window filter is adapted to perform the statistical inference using Student-t statistics.

9. The system of claim 6 wherein the outlier elimination mechanism is adapted to generate the first prediction cone and the second prediction cone by linear regression of the data points in the left sample window and linear regression of the data points in the right sample window.

10. The system of claim 9 wherein the outlier elimination mechanism is adapted to move the left sample window, right sample window, and test window through the data set to remove outliers through out the data set.

11. The system of claim 6 wherein the outlier elimination mechanism is adapted to determine outliers by a weighted reciprocal of confidence intervals generated by prediction cones.

12. The system of claim 6 wherein the physical system comprises an aircraft system.

13. A method of trending data from a physical system, the method comprising the steps of:
   a) receiving, from the physical system, a data set comprising a plurality of data points;
   b) selecting multiple data windows in the data set, each of the data windows including a subset plurality of data points, and with adjacent windows in the multiple data windows overlapping in the data set;
   c) generating upper confidence bounds and lower confidence bounds for each of the data points using each of the multiple data windows that includes the data point;
   d) generating a first convex hull from a first set of the upper confidence bounds and generating a second convex hull from a second set of the lower confidence bounds;
   e) determining a transition point in the data set from the first convex hull and the second convex hull; and
   f) generating an estimated trend of the data set from the transition point and selected upper confidence bounds and lower confidence bounds for each data point, the estimated trend of the data set for fault detection in the physical system.

14. The method of claim 13 wherein the step of determining a transition point in the data stream from the first convex hull and the second convex hull comprises determining if the first convex hull and the second convex hull intersect.

15. The method of claim 13 wherein the step of determining a transition point in the data stream from the first convex hull and the second convex hull comprises comparing the first convex hull to the second convex hull to determine if the first convex hull and the second convex hull intersect, and further comprises iteratively discarding points in the data set and generating a new first convex full and a second new convex full until there is no intersection between the first new convex hull and the second new convex hull.

16. The method of claim 13 wherein the physical system comprises an aircraft system.

17. The method of claim 13 wherein the step of generating upper confidence bounds and lower confidence bounds comprises generating through a linear regression and statistical inference.

18. A method of trending data from a physical system, the method comprising the steps of:
   a) receiving, from the physical system, a data set comprising a plurality of data points;
   b) selecting multiple data windows in the data set, each of the data windows including a subset plurality of data points, and with adjacent windows in the multiple data windows overlapping in the data set;
   c) generating upper confidence bounds and lower confidence bounds for each of the data points using each of the multiple data windows that includes the data point;
   d) selecting an upper confidence bounds and a lower confidence bounds for each data point that results in the smallest confidence interval between the upper confidence bounds and lower confidence bounds; and
   e) removing outlier data from the data stream by generating a first prediction cone for data points in a left samples window, generating a second prediction cone for data points in a right sample window, and determining if data points in a test window reside in the first prediction cone and the second prediction cone;
   f) generating a filtered estimate of the data set from the selected upper confidence bounds and lower confidence bounds for each data point, the filtered estimate of the data set for fault detection in the physical system.

19. The method of claim 18 wherein the step of generating upper confidence bounds and lower confidence bounds comprises generating through a linear regression and statistical inference.

20. The method of claim 19 wherein the statistical inference comprises using student-t statistics.

21. The method of claim 18 wherein the first prediction cone and the second prediction cone are generated by linear regression of the data points in the left sample window and linear regression of the data points in the right sample window.

22. The method of claim 18 comprising the step of moving the left sample window, right sample window and test window through the data set to remove outliers through out the data set.

23. The method of claim 18 wherein the physical system comprises an aircraft system.

24. A computer readable medium embodying a computer program product, said program product comprising:
- a trending program, the trending program including:
  - a sliding window filter, the sliding window filter adapted to receive a data set from the physical system, the data set comprising a plurality of data points, the sliding window filter selecting multiple data windows in the data set, with each of the data windows including a subset plurality of the data points in the data set, and with adjacent windows in the multiple data windows overlapping in the data set, the sliding window filter adapted to generate upper confidence bounds and lower confidence bounds for each data point using each of the multiple data windows that includes the data point, the sliding window filter adapted to select an upper confidence bounds and a lower confidence bounds for each data point that results in the smallest confidence interval between the upper confidence bounds and lower confidence bounds for that data point, and wherein the sliding window filter is adapted to generate a filtered estimate of the data set from the selected upper confidence bounds and lower confidence bounds for each data point;
  - a trend change detection mechanism, the trend change detection mechanism adapted to determine a first convex hull for a set of upper confidence bounds and a second convex hull for a set of lower confidence bounds, the trend change detection mechanism adapted to compare the first convex hull and the second convex hull to determine a transition point in the data set, the trend change detection mechanism adapted to determine an estimated trend of the data set based on the transition point and the set of upper confidence bounds and the set of lower confidence bounds.

25. The computer readable medium of claim 24 wherein the trend change detection mechanism is adapted to compare the first convex hull to the second convex hull by determining if the first convex hull and the second convex hull intersect.

26. The computer readable medium of claim 24 wherein the trend change detection mechanism is adapted to compare the first convex hull and the second convex hull to determine a transition point in the data stream by determining if the first convex hull and the second convex hull intersect, and by iteratively discarding points in the data set and generating a new first convex hull and a new second convex hull until there is no intersection between the new first convex hull and a new second convex hull.

27. The computer readable medium of claim 24 wherein the physical system comprises an aircraft system.

28. The computer readable medium of claim 24 wherein the sliding window filter is adapted to generate the upper confidence bounds and lower confidence bounds through linear regression and statistical inference of the data set.

29. A computer readable medium embodying a computer program product, said program product comprising:
- a trending program, the trending program including:
  - a sliding window filter, the sliding window filter adapted to receive a data set from die physical system, the data set comprising a plurality of data points, the sliding window filter selecting multiple data windows in the data set, with each of the data windows including a subset plurality of the data points in the data set, and with adjacent windows in the multiple data windows overlapping in the data set, the sliding window filter adapted to generate upper confidence bounds and lower confidence bounds for each data point using each of the multiple data windows that includes the data point, the sliding window filter adapted to select an upper confidence bounds and a lower confidence bounds for each data point that results in the smallest confidence interval between the upper confidence bounds and lower confidence bounds for that data point, and wherein the sliding window filter is adapted to generate a filtered estimate of the data set from the selected upper confidence bounds and lower confidence bounds for each data point;
  - an outlier elimination mechanism, the outlier elimination mechanism adapted to remove statistical outliers in the data set by generating a first prediction cone for data points in a left sample window, generating a second prediction cone for data points in a right sample window, and determining if data points in a test window reside in the first prediction cone and the second prediction cone.

30. The computer readable medium of claim 29 wherein the sliding window filter is adapted to generate the upper confidence bounds and lower confidence bounds through linear regression and statistical inference of the data set.

31. The computer readable medium of claim 30 wherein the sliding window filter is adapted to perform the statistical inference using Student-t statistics.

32. The computer readable medium of claim 29 wherein the outlier elimination mechanism is adapted to generate the first prediction cone and the second prediction cone by linear regression of the data points in the left sample window and linear regression of the data points in the right sample window.

33. The computer readable medium of claim 32 wherein the outlier elimination mechanism is adapted to move the left sample window, right sample window, and test window through the data set to remove outliers through out the data set.

34. The computer readable medium of claim 29 wherein file outlier elimination mechanism is adapted to determine outliers by a weighted reciprocal of confidence intervals generated by prediction cones.

35. The computer readable medium of claim 29 wherein the physical system comprises an aircraft system.

* * * * *

UNITED STATES PATENT AND TRADEMARK OFFICE
CERTIFICATE OF CORRECTION

| | |
|---|---|
| PATENT NO. | : 7,580,812 B2 |
| APPLICATION NO. | : 10/767034 |
| DATED | : August 25, 2009 |
| INVENTOR(S) | : Ariyur et al. |

Page 1 of 1

It is certified that error appears in the above-identified patent and that said Letters Patent is hereby corrected as shown below:

Column 16, line 16, "full" should be changed to --hull--;
Column 16, line 17, "full" should be changed to --hull--;
Column 18, line 3, "die" should be changed to --the--;
Column 18, line 48, "file" should be changed to --the--.

Signed and Sealed this

Twentieth Day of October, 2009

David J. Kappos
*Director of the United States Patent and Trademark Office*

UNITED STATES PATENT AND TRADEMARK OFFICE
CERTIFICATE OF CORRECTION

PATENT NO. : 7,580,812 B2  
APPLICATION NO. : 10/767034  
DATED : August 25, 2009  
INVENTOR(S) : Ariyur et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1609 days.

Signed and Sealed this

Fourteenth Day of September, 2010

David J. Kappos  
*Director of the United States Patent and Trademark Office*